United States Patent
Shimizu et al.

(10) Patent No.: US 12,431,823 B2
(45) Date of Patent: Sep. 30, 2025

(54) DISPLACEMENT DETECTION DEVICE

(71) Applicant: MURATA MACHINERY, LTD., Kyoto (JP)

(72) Inventors: Tetsuya Shimizu, Kyoto (JP); Kentaro Otomo, Kyoto (JP); Ryohei Kido, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 213 days.

(21) Appl. No.: 18/276,067

(22) PCT Filed: Feb. 2, 2022

(86) PCT No.: PCT/JP2022/004142
§ 371 (c)(1),
(2) Date: Aug. 7, 2023

(87) PCT Pub. No.: WO2022/185825
PCT Pub. Date: Sep. 9, 2022

(65) Prior Publication Data
US 2024/0128902 A1 Apr. 18, 2024

(30) Foreign Application Priority Data
Mar. 1, 2021 (JP) .................. 2021-031408

(51) Int. Cl.
*H02P 6/16* (2016.01)
(52) U.S. Cl.
CPC ............ *H02P 6/16* (2013.01); *H02P 2203/01* (2013.01)
(58) Field of Classification Search
CPC ....... H02P 6/16; H02P 2203/01; G01D 5/244; G01D 5/245
See application file for complete search history.

(56) References Cited

U.S. PATENT DOCUMENTS

| 6,034,624 A | 3/2000 | Goto et al. |
| 12,044,555 B2 * | 7/2024 | Shimizu ............... G01D 5/2451 |
| 2013/0249452 A1 | 9/2013 | Shinohara |

FOREIGN PATENT DOCUMENTS

| JP | 02-251720 A | 10/1990 |
| JP | 09-311762 A | 12/1997 |

(Continued)

OTHER PUBLICATIONS

Official Communication issued in International Patent Application No. PCT/JP2022/004142, mailed on Apr. 26, 2022.

*Primary Examiner* — Christopher E Mahoney
(74) *Attorney, Agent, or Firm* — Keating & Bennett, LLP

(57) ABSTRACT

A displacement detection device includes a detection signal processor including a first differential amplifier a to output a first AC signal acquired by synthesizing a cosine function and a minus cosine function, a second differential amplifier to output a second AC signal acquired by synthesizing a sine function and a minus sine function, and a processor to determine, at least at a start of use of the displacement detection device, a value that substantially indicates a phase displacement amount between an excitation signal and the first AC signal and the second AC signal. When detecting displacement, the processor is configured or programmed to perform an arctangent computation using values of the first and second AC signals acquired at a timing based on the value that is determined, and output relative displacement information of a scale with respect to a magnetic detection head.

4 Claims, 6 Drawing Sheets

(56) References Cited

FOREIGN PATENT DOCUMENTS

| JP | 10-170356 A | | 6/1998 | |
|----|-------------|---|--------|------------|
| JP | H11-223505  | * | 8/1999 | G01B 7/003 |

* cited by examiner

DISPLACEMENT DETECTION DEVICE

BACKGROUND OF THE INVENTION

1. Field of the Invention

The present invention relates to a displacement detection device for detecting displacement of a measurement target.

2. Description of the Related Art

A displacement detection device that measures the displacement of a measurement target using electromagnetic induction phenomena is conventionally known. Japanese Patent No. 5802588 discloses a rotational resolver as a displacement detection device of this type.

The rotational resolver of Japanese Patent No. 5802588 is used to acquire the rotation angle of a motor. This rotational resolver is equipped with an AD converter and a corrector. The AD converter performs analog-to-digital conversion of multiple signal waves with different phases. The phase of the AD-converted signal wave is delayed with respect to the phase of an excitation signal. The excitation signal having a reference phase position within the excitation period is input to the corrector, and the signal waves having multiple phases from the AD conversion section are also input to the corrector. The corrector detects a zero-crossing phase of the sum-of-squares average signal of the signal waves with multiple phases, and performs correction to make the phase of the excitation signal delayed based on the position of the zero-crossing phase and the correction direction of phase displacement in the phase interval by equally dividing the excitation period. The phase of the excitation signal is delayed by a displacement amount from the reference phase position, which is a phase difference between the phase of the excitation signal and the phase of the signal wave.

SUMMARY OF THE INVENTION

In the above configuration of Japanese Patent No. 5802588, the signal waves having multiple phases from the AD converters are eventually converted into a signal whose phase changes according to the rotation angle of the motor. By computing the phase of this signal, the rotation angle of the motor can be acquired.

In order to accurately detect the rotation angle of the motor with the configuration of Japanese Patent No. 5802588, the phase of the signal must be accurately acquired. The detection of the phase of the signal is usually performed by repeatedly counting from a reference timing in the excitation signal to a timing when a characteristic point (e.g., zero-crossing point) appears in the signal waveform, using a counter. To detect the signal phase with high accuracy, the time resolution of the counter must be increased. However, it may be difficult to increase the time resolution of the counter because of the limitation of increasing the operating clock of the electronic circuit.

The resolution for detecting the rotation angle of the motor can be improved also by lengthening the excitation period. However, if the excitation period is lengthened, the detection followability deteriorates when the rotation angle of the motor changes at high speed. Thus, the configuration of Japanese Patent No. 5802588 is difficult to achieve both high-speed response and high resolution at the same time, and there is room for improvement.

Preferred embodiments of the present invention provide displacement detection devices that each can resolve an error that changes due to external factors such as temperature on the spot by calculation, and can achieve both high-speed response and high resolution.

According to an aspect of a preferred embodiment of the present invention, a displacement detection device of the following configuration is provided. That is, the displacement detection device is operable to detect displacement of a measurement target in a displacement detection direction. The displacement detection device includes a scale, a sensor head, and a signal processor. In the scale, magnetic-responsive portions and non-magnetic-responsive portions are alternately arranged at a predetermined detection pitch in the displacement detection direction. The sensor head includes an excitation element and at least four magnetic detection elements. An excitation signal is applied to the excitation element. Output signals of the four magnetic detection elements correspond to sine, cosine, minus sine, and minus cosine functions, respectively. The output signals of the magnetic detection elements are input to the signal processor. The signal processor is configured or programmed to compute and output relative displacement information of the scale with respect to the sensor head. The signal processor includes a first differential amplifier to output a first AC signal acquired by synthesizing the cosine function and the minus cosine function, a second differential amplifier to output a second AC signal acquired by synthesizing the sine function and the minus sine function, and a processor to, at least when use of the displacement detection device is started, determine a value substantially indicating a phase displacement amount between the excitation signal and the first and the second AC signals. When detecting the displacement of the measurement target, the processor is configured or programmed to acquire values of the first AC signal and the second AC signal at a timing based on the determined value, and to perform an arctangent computation using the acquired value of the first AC signal and the acquired value of the second AC signal to output the relative displacement information.

This allows the values of each of the signals to be acquired at a time when the first and second AC signals deviate sufficiently from zero. Thus, by dividing the value of the signal, a highly accurate tangent value can be acquired. By performing the arctangent computation on this tangent value, accurate displacement can be acquired. Since displacement is acquired by the arctangent computation, it is also possible to acquire displacement multiple times per excitation signal period. Therefore, in addition to high resolution, fast response of detection can be easily achieved.

It is preferable that the displacement detection device described above includes an amplitude adjuster to adjust an amplitude of the first AC signal output by the first differential amplifier and an amplitude of the second AC signal output by the second differential amplifier.

This allows, for example, the amplitude to be modified in response to changes in the transformer ratio of the magnetic detection head. As a result, waveforms suitable for the detection of displacement can be stably acquired.

In the displacement detection device described above, it is preferable that the amplitude adjuster is operable to adjust an amplitude of the AC current flowing in the excitation element.

This allows the gain setting process for the first and the second differential amplifiers to be omitted. Thus, a simplified process can be achieved.

In the displacement detection device described above, it is preferable that the amplitude adjuster is operable to adjust amplification gains of the first differential amplifier and the second differential amplifier.

This allows the amplitude of the waveforms output by the first and the second differential amplifiers to be adjusted more directly.

In the displacement detection device described above, the following configuration is preferable. That is, at least when the use of the displacement detection device is started, a plurality of identification excitation signals generated by shifting phases in which each of phase shift amounts is different from the other from the excitation signal are applied to the excitation element. As each of the identification excitation signals is applied to the excitation elements, the processor is configured or programmed to acquire a value of the first AC signal and a value of the second AC signal at a timing that is constant with respect to the original excitation signal, to acquire an aggregation of deviation degrees of the values of the first AC signal and the second AC signal from zero. The processor is configured or programmed to acquire the phase shift amount of the identification excitation signal for which the aggregation is largest among the plurality of the identification excitation signals, and to acquire the value substantially indicating the phase displacement amount based on this phase shift amount.

This allows the timing at which the first and second AC signals deviate sufficiently from zero to be acquired, by exciting the excitation element with the identification excitation signals with different phases, and by examining.

In the displacement detection device described above, the following configuration is preferable. That is, at least when the use of displacement detection device is started, the processor is configured or programmed to repeatedly acquire a value of the first AC signal and a value of the second AC signal with a sampling period shorter than the period of the signals. For each of a plurality of sampling timings, the processor is configured or programmed to acquire an aggregation of deviation degrees of the values of the first AC signal and the second AC signal from zero. The processor is configured or programmed to acquire the sampling timing at which the aggregation is the largest among the plurality of the sampling timings at which the aggregations are acquired, and to acquire the value substantially indicating the phase displacement amount based on the sampling timing acquired by the processor.

This allows the timing at which the first and second AC signals deviate sufficiently from zero to be acquired in a short time.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
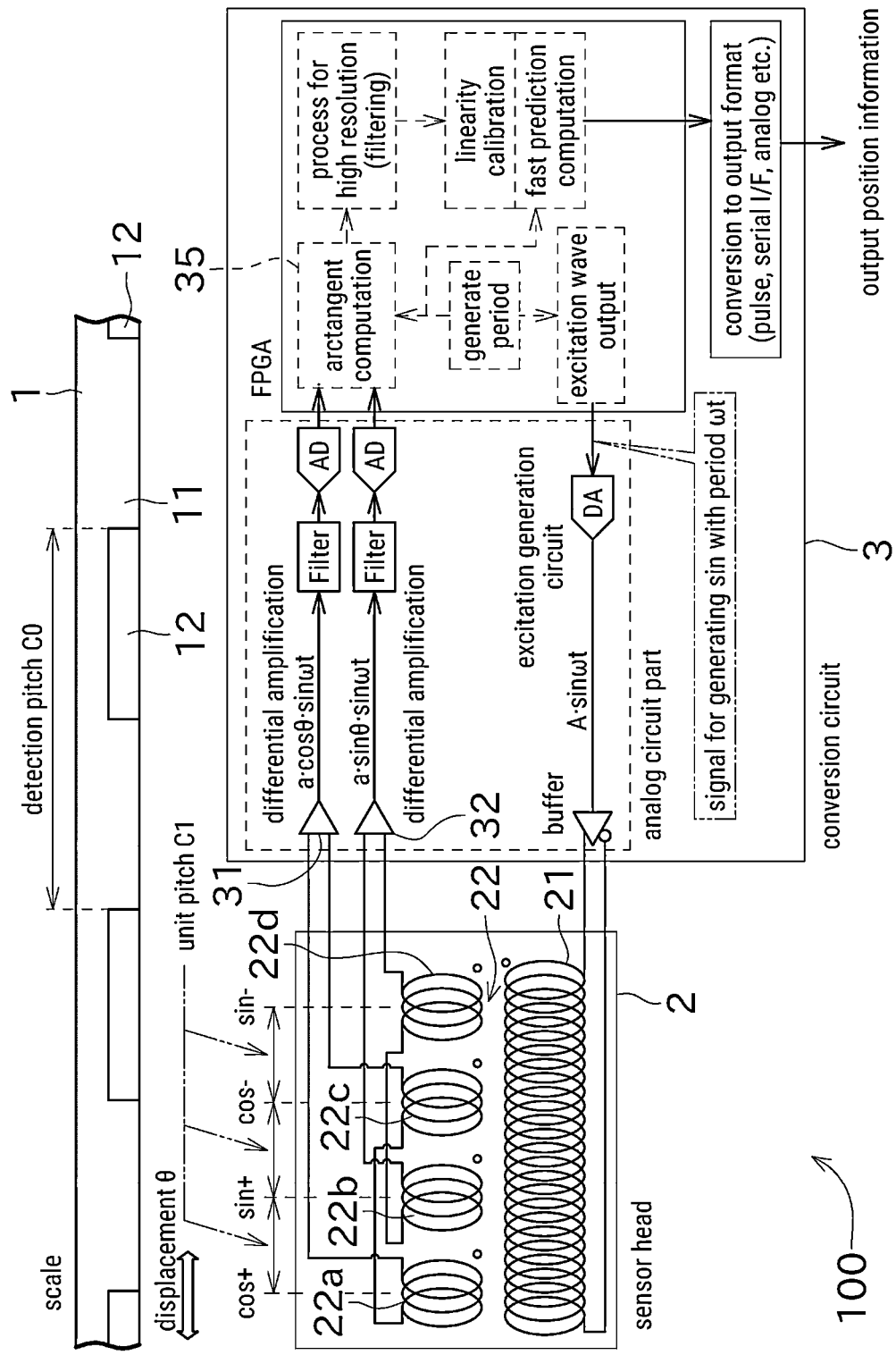
FIG. 1 is a block diagram showing a configuration of a displacement detection device according to a first preferred embodiment of the present invention.
Figure 2:
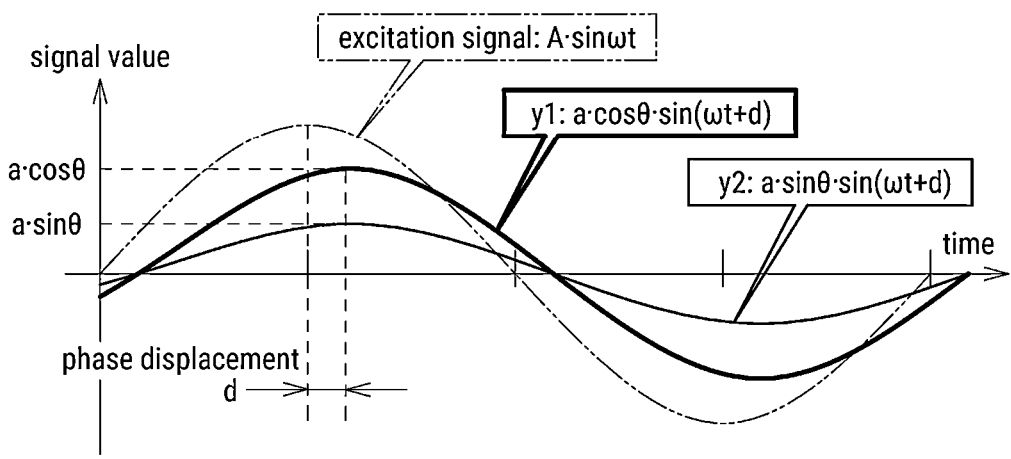
FIG. 2 is a diagram showing waveforms of an excitation signal, a first AC signal, and a second AC signal.

Next, preferred embodiments of the present invention will be described with reference to the drawings. FIG. 1 is a block diagram showing a configuration of a displacement detection device 100 according to a preferred embodiment of the present invention. FIG. 2 is a diagram showing waveforms of an excitation signal, a first AC signal y1, and a second AC signal y2.

The displacement detection device 100 shown in FIG. 1 is used to detect displacement of a measurement target in a predetermined direction. In the following description, the direction in which the displacement of the measurement target is detected may be referred to as displacement detection direction.

"Displacement" is a value indicating how much the current position has changed compared to a reference position (for example, the initial position). By defining the reference position in an appropriate manner, the position itself of the measurement target can also be computed from the displacement. Thus, the displacement detection device 100 can be used as a position detection device.

The displacement detection device 100 mainly includes a scale 1, a magnetic detection head (sensor head) 2, and a detection signal processor (signal processor) 3.

Any one of the scale 1 and the magnetic detection head 2 is attached to the measurement target. For example, the scale 1 may be attached to a movable member (not shown), and the magnetic detection head 2 may be attached to a fixed member, not shown, as the measurement target. The movable member can move linearly along a path parallel to the displacement detection direction.

The scale 1 may be attached to the fixed member as the measurement target, and the magnetic detection head 2 may be attached to the movable member. Furthermore, both the scale 1 and the magnetic detection head 2 may be respectively attached to the movable members which are displaced relative to each other. In this case, the displacement detection device 100 detects the relative displacement of the measurement target (i.e., the scale 1 and the magnetic detection head 2).

The scale 1 is used as a scale to detect the displacement of the measurement target in the longitudinal direction of the scale 1. The scale 1 is elongated in a direction parallel to a movement stroke of the magnetic detection head 2 caused by the movement of the movable member, to include this movement stroke. The scale 1 may include an elongated block or an elongated rod.

The scale 1 includes non-magnetic-responsive portions 11 and magnetic-responsive portions 12. The non-magnetic-responsive portion 11 is made of a material such as, for example, a metal having no significant magnetic properties or a plastic having no magnetic properties. The magnetic-responsive portion 12 is made of, for example, a metal having ferromagnetism. The non-magnetic-responsive portions 11 and the magnetic-responsive portions 12 are arranged alternately in the longitudinal direction of the scale 1.

The magnetic-responsive portions 12 are lined up in the longitudinal direction of the scale 1 at every predetermined detection pitch C0. Since the magnetic-responsive portions 12 are arranged side by side and spaced by a predetermined interval, a non-magnetic-responsive portion, which is a portion with no magnetism (or relatively weak magnetism), is located between two magnetic-responsive portions 12 adjacent to each other. Therefore, in the magnetic-responsive portions 12, the presence/absence or strength/weakness of magnetic responsiveness appears alternately and repeatedly at every detection pitch C0 in the longitudinal direction of the scale 1.

As shown in FIG. 1, the magnetic detection head 2 is provided at a predetermined distance from the magnetic-responsive portion 12. If the scale 1 includes an elongated rod, the magnetic detection head 2 can be configured, for example, to be cylindrical and the scale 1 can be configured to insert into a cylindrical hole that the magnetic detection head 2 has. However, the shape of the magnetic detection head 2 is not limited. The magnetic detection head 2 includes a primary coil (excitation element) 21 and a plurality of secondary coils (magnetic detection elements) 22. Four secondary coils 22 are provided in this preferred embodiment, for example.

The primary coil 21 is used to generate an alternating magnetic field. As shown in FIG. 1, the primary coil 21 is located on the side farther from the scale 1 than the secondary coil 22, in the magnetic detection head 2.

When an AC current of an appropriate frequency is applied to the primary coil 21, a magnetic field of periodically varying direction and strength is generated around it. In this preferred embodiment, as shown in FIG. 1, the excitation signal (A·sin ωt) acquired by DA conversion of the excitation wave generated by a device such as a Field Programmable Gate Array (FPGA) included in the detection signal processor 3 which will be described later, is applied to the primary coil 21.

The four secondary coils 22 are lined up in a direction parallel to the longitudinal direction of the scale 1, as shown in FIG. 1. In the magnetic detection head 2, the secondary coils 22 are located on the side closer to the scale 1 than the primary coil 21. Induced currents flow the four secondary coils 22, which are induced by the magnetic field strengthened by the magnetic-responsive portion 12. The magnetic detection head 2 detects and outputs an electrical signal (for example, voltage signal) based on this induced current.

As shown in FIG. 1, the four secondary coils 22 are lined up at every predetermined unit pitch C1 in the displacement detection direction. This unit pitch C1 is determined based on the detection pitch C0 so as to have a predetermined relationship with the detection pitch C0 described above. For example, the unit pitch C1 is set as the sum of an integer multiple of the detection pitch C0 and ¼ of the detection pitch C0, as shown in the following equation.

$$C1 = (n + 1/4) \cdot C0$$

Here, n is an integer. In this preferred embodiment, n=0, but is not limited to this.

In the following description, each of the four secondary coils may be referred to as first coil 22a, second coil 22b, third coil 22c, and fourth coil 22d, starting from the left side shown in FIG. 1, in order to identify each of the four secondary coils.

The signals (for example, voltage signals) output by each secondary coil 22 will now be briefly described. When an AC current of an appropriate frequency is applied to the primary coil 21, a magnetic field whose direction and strength vary periodically is generated in the primary coil 21. On the other hand, induced currents are generated in the secondary coils 22 in directions that interfere with the change in the magnetic fields of the coils. When a ferromagnetic material is present in the vicinity of the primary coil 21, this ferromagnetic material acts to strengthen the magnetic field generated by the primary coil 21. This action increases the closer the ferromagnetic body is to the primary coil 21.

Focusing on one magnetic-responsive portion 12, as the magnetic detection head 2 moves relative to the scale 1 from one side to the other side in the longitudinal direction, the primary coil 21 and the secondary coils 22 move closer to this magnetic-responsive portion 12, but after the closest approach, they move apart from it. The induced current generated in the secondary coil 22 is an AC current, but the magnitude of its amplitude varies depending on the positional relationship between the secondary coil 22 and the magnetic-responsive portion 12.

Since the magnetic-responsive portions 12 are actually arranged repeatedly at each detection pitch C0, the change in amplitude magnitude is repeated at each detection pitch C0. That is, if the position of the magnetic detection head 2 is taken on the horizontal axis and the magnitude of the amplitude is taken on the vertical axis, the relationship between the amplitude and position is a periodic curve with the detection pitch C0 as the period (specifically, a sine curve y=sin θ). If this θ can be computed, it is possible to acquire the position of the scale 1 with respect to the magnetic detection head 2 in the detection pitch C0 which is a repetition unit.

However, considering one period of the sine curve y=sin θ, there are two possible values of θ corresponding to y and not just one, except in special cases. Therefore, in this preferred embodiment, the four secondary coils 22 are arranged at intervals determined by the unit pitch C1 described above, so that the positional relationships between each the secondary coils 22 and the nearest magnetic-responsive portion 12 thereof are substantially displaced every ¼ of the detection pitch C0.

As shown in FIG. 1, for example, each of the first coil 22a, the second coil 22b, the third coil 22c, and the fourth coil 22d is spaced from each other only by ¼ of the detection pitch C0, and thus the four coils output voltage signals which are 90° out of phase with each other. That is, if the voltage signal output by the first coil 22a is expressed as cos+ phase, the second coil 22b outputs a voltage signal in sin+ phase, the third coil 22c outputs a voltage signal in cos− phase, and the fourth coil 22d outputs a voltage signal in sin− phase.

The detection signal processor 3 processes the voltage signals output from the first coil 22a, the second coil 22b, the third coil 22c, and the fourth coil 22d to compute and output the relative displacement of the scale 1 relative to the magnetic detection head 2.

The detection signal processor 3 includes, for example, a first differential amplifier 31, a second differential amplifier 32, and a processor 35, as shown in FIG. 1.

In this preferred embodiment, the first differential amplifier 31 and the second differential amplifier 32 include circuits (or electronic components) that include analog circuits provided by the detection signal processor 3. The processor 35 is realized by an FPGA or the like provided in the detection signal processor 3 executing a program.

The first differential amplifier 31 is used to amplify the difference between the outputs of the first coil 22a and the third coil 22c. The first differential amplifier 31 amplifies the difference between the voltage signals output from the first coil 22a and the third coil 22c, and outputs as the first AC signal y1.

When the phase representing the displacement of the scale 1 with respect to the magnetic detection head 2 is 0, the first AC signal y1 described above can be expressed by the following equation.

$$y1 = a\cos\theta \cdot \sin\omega t$$

The first AC signal y1 is processed by a filter and then converted from an analog signal to a digital signal by an AD converter and input to the processor 35.

The second differential amplifier 32 is used to amplify the difference between the outputs of the second coil 22b and the fourth coil 22d. The second differential amplifier 32 amplifies the difference between the voltage signals output from the second coil 22b and the fourth coil 22d, and outputs as the second AC signal y2.

When the phase representing the displacement of the scale 1 with respect to the magnetic detection head 2 is 0, the second AC signal y2 described above can be expressed by the following equation.

$$y2 = a\sin\theta \cdot \sin\omega t$$

The second AC signal y2 is processed by a filter in the same way as the first AC signal y1 described above, and then converted from an analog signal to a digital signal by an AD converter and input to the processor 35.

The processor 35 performs an arctangent computation on the first AC signal y1 and the second AC signal y2 which are digital signals. Specifically, the processor 35 divides the second AC signal y2 which is a digital signal, by the first AC signal y1. This result corresponds to the value of $\tan\theta$. The processor 35 then acquires the arctangent value of the calculation result. This allows the phase $\theta$, which represents the displacement of the scale 1 with respect to the magnetic detection head 2, to be computed as relative displacement information of the scale 1. $\theta$ is a phase when considered strictly but, it substantially indicates the relative displacement of the scale 1 with respect to the magnetic detection head 2. Therefore, $\theta$ may be referred to as "displacement" in the following.

The displacement $\theta$ computed by the processor 35 is input to a filter to remove high-frequency components. This allows for the removal of noise and the like. The filtered value is post-processed such as linearity calibration, then output from the detection signal processor 3 as position information.

Next, the phase displacement between the primary coil 21 and the secondary coil 22 will be described in detail.

As is known, between the excitation signal applied to the primary coil 21 and the output of the secondary coil 22 (the first AC signal y1 and the second AC signal y2), a phase displacement amount d occurs, as shown in FIG. 2. Specifically, the phase of the first AC signal y1 and the second AC signal y2 is delayed by a phase displacement amount d relative to the excitation signal. This phase displacement amount d is caused by differences in coil design, resistance factors in the wiring (wiring type, length, and routing), and other factors. The magnitude of the phase displacement amount d varies depending on the surrounding environment, such as temperature.

In the processor 35 of this preferred embodiment, a timing for acquiring the values of the first AC signal y1 and the second AC signal y2 to detect the displacement of the scale 1 with respect to the magnetic detection head 2 is predetermined so that the respective signals are sufficiently deviated from zero while taking the above phase displacement amount d into account. This timing is determined relative to the timing of the excitation signal.

As described above, $\tan\theta$ is computed by dividing the second AC signal y2 by the first AC signal y1. Therefore, if the values of the two signals are near zero, the accuracy of $\tan\theta$ decreases. Considering this, it is most preferable that the timing at which the values of the first AC signal y1 and the second AC signal y2 are acquired coincide with the timing when the values of the two signals have positive or negative peaks. However, since the accuracy of $\tan\theta$ can be sufficiently ensured if the values of the two signals are some distance from zero, it is not necessary that the values of signals are acquired at the timing when their values are strictly at their peaks.

When the excitation signal is expressed as $A \cdot \sin\omega t$, the first AC signal y1 and the second AC signal y2 are expressed by the following equations.

$$y1 = a\cos\theta \cdot \sin(\omega t + d)$$

$$y2 = a\sin\theta \cdot \sin(\omega t + d)$$

The d in those equations represents the phase displacement described above.

The timing when the values of the first AC signal y1 and the second AC signal y2 show positive or negative peaks means the timing when the phase of $\omega t + d$ is 90° or 270°. On the other hand, at the timing when the phase of $\omega t + d$ is 0° or 180°, the values of the first AC signal y1 and the second AC signal y2 are both near zero.

Therefore, in this preferred embodiment, for measuring the displacement $\theta$, the values of the first AC signal y1 and the second AC signal y2 are acquired at sufficiently different timings, for example, with respect to the timing when the phase $\omega t + d$ is 0° or 180°. If the phase displacement amount d can be determined with some accuracy, the timing for taking out the values of the first AC signal y1 and the second AC signal y2 used in the arctangent computation can be generated appropriately.

Figure 3:
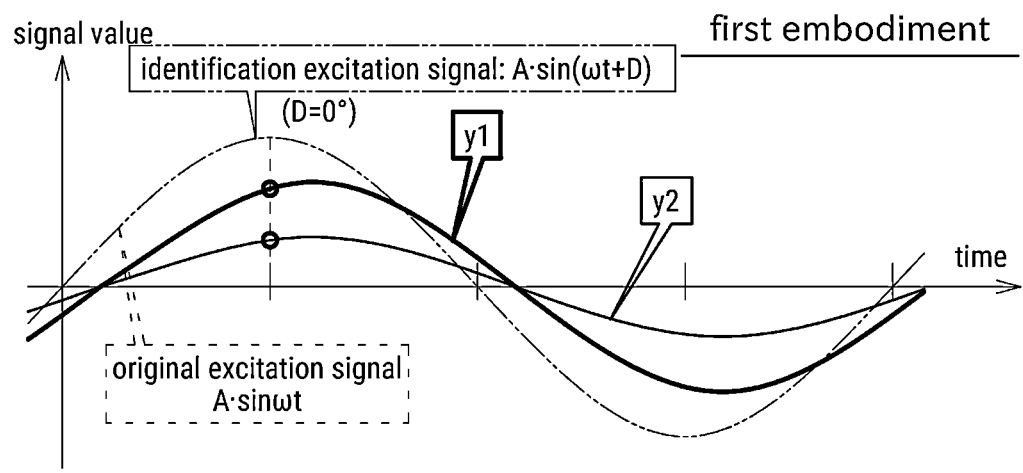
FIG. 3 is a diagram illustrating an identification excitation signal which has the same phase as the original excitation signal in a first preferred embodiment of the present invention.
Figure 4:
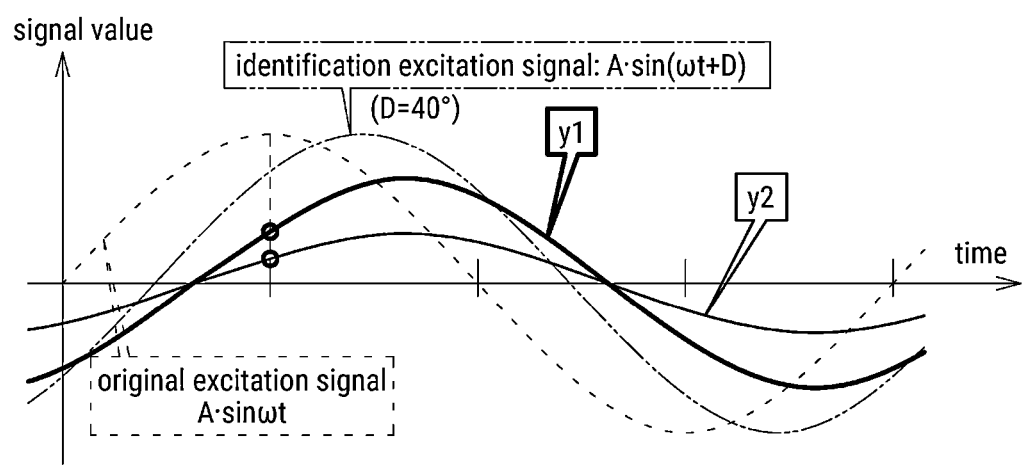
FIG. 4 is a diagram illustrating an identification excitation signal generated with a phase delay of 40° from an original excitation signal.
Figure 5:
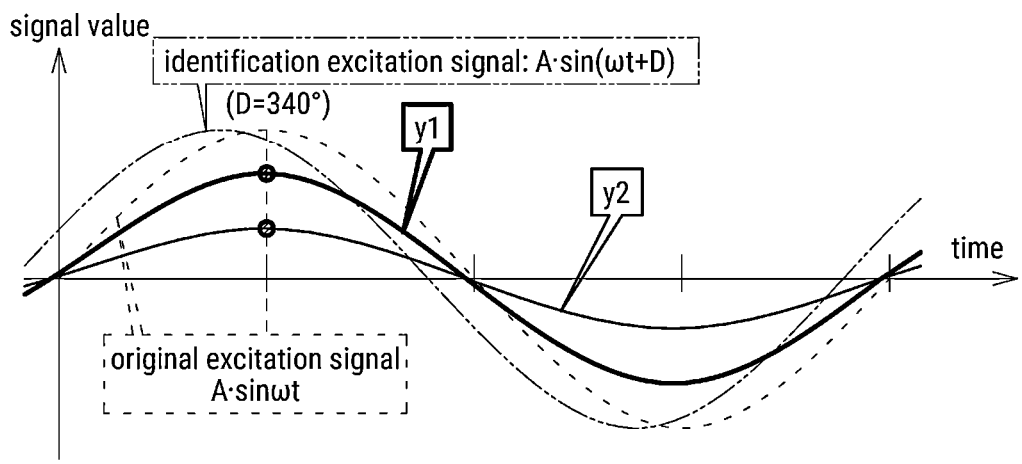
FIG. 5 is a diagram illustrating an identification excitation signal generated with a phase delay of 340° from an original excitation signal.

The phase displacement amount d can be determined, for example, using a sequential phase shift method of the excitation signals as shown in FIGS. 3 through 5.

The following is a specific explanation. The processor 35 generates a plurality of identification excitation signals based on the excitation signal described above and applies each of the identification excitation signals to the primary coil 21 sequentially. The identification excitation signals are generated by shifting the phase with respect to the original excitation signal by an amount of shift that differs from each other. Examples of identification excitation signals are shown in FIGS. 3 through 5.

Regarding the identification excitation signals, FIG. 3 shows the case where the phase shift amount D is 0°, FIG. 4 shows the case where it is 40°, and FIG. 5 shows the case where it is 340°, for example. As described above, a plurality of excitation signals for identification may include one without phase shift, i.e., with the same phase with respect to the original excitation signal.

The sequential phase shift method will be described in detail. Assuming the original excitation signal is A·sin ωt, the identification excitation signal can be expressed as A·sin(ωt+D), where D is the phase shift amount in the delaying direction. By successively changing the value of D to 0°, 10°, 20°, . . . , and so on, multiple identification excitation signals can be generated.

Each time the processor 35 generates an identification excitation signal, it actually applies the identification excitation signal to the primary coil 21. Each identification excitation signal is applied to the primary coil 21 for a sufficient time span, e.g., for more than one period of the excitation signal.

Each time the respective identification excitation signal is applied to the primary coil 21, the processor 35 acquires the values of the first AC signal y1 and the second AC signal y2 at the timing when the original excitation signal A·sin ωt is at the amplitude peak position. With respect to the amplitude peak position, the phase of ωt can be either 90° or 270°, but the examples in FIGS. 3 through 5 show an example of acquiring at 90°.

Thus, no matter when identification excitation signal is applied, the timing at which the values of the first AC signal y1 and the second AC signal y2 are acquired is constant. However, since the phase of the identification excitation signal changes at 10° intervals, the phase of the values of the first AC signal y1 and the second AC signal y2 also changes at 10° intervals accordingly. Therefore, as shown in FIGS. 3 through 5, if the identification excitation signal is changed, the values of the first AC signal y1 and the second AC signal y2 that are acquired differ.

For each time the respective identification excitation signal is applied to the primary coil 21, the processor 35 computes a value that substantially represents an aggregation of the degrees to which the values of the first AC signal y1 and the second AC signal y2 acquired at the above timing deviate from zero. Hereinafter, this value may be referred to as a signal deviation aggregation value. In this preferred embodiment, the square root of the sum of the squares of the first AC signal y1 and the second AC signal y2 is computed as the signal deviation aggregation value, as in the following equation.

signal deviation aggregation value=√((first AC signal y1)^2+(second AC signal y2)^2)

However, the sum of the absolute values of the first AC signal y1 and the second AC signal y2 may be computed as the signal deviation aggregation value, as in the following equation.

signal deviation aggregation value=|first AC signal y1|+|second AC signal y2|

In this case, the load of calculation can be reduced compared to the square root of the sum of squares described above.

After computing the signal deviation aggregation values for the identification excitation signals respectively, the processor 35 compares the signal deviation aggregation values to each other. This allows the phase shift amount D corresponding to the identification excitation signal for which the signal deviation aggregation value is the largest to be acquired. In this example, the signal deviation aggregation value is the largest for the identification excitation signal shown in FIG. 5, where the phase shift amount D is 340°. The processor 35 subtracts this phase shift amount D, 340°, from 360° to acquire the phase displacement estimation amount $d_e$. In this example, the phase displacement estimation amount $d_e$ is 20° ($d_e$=360°−3400=20°).

In this example, the phase shift amount D of the identification excitation signal varies in units of 10°, so the accuracy of the phase displacement estimation amount $d_e$ is not high. However, the phase displacement estimation amount $d_e$ is a value close to the phase displacement amount d. Therefore, the phase displacement estimation amount $d_e$ can be said to be a value that substantially indicates the phase displacement amount d. When the determined phase displacement estimation amount $d_e$ is stored in appropriate memory, the initial processing is completed.

In the subsequent measurement of displacement θ, the timing for acquiring the values of the first AC signal y1 and the second AC signal y2 is determined based on the acquired phase displacement estimation amount $d_e$. Specifically, the values of the first AC signal y1 and the second AC signal y2 are acquired at a timing sufficiently different from the timing when ωt+$d_e$ is 0° or 180°, for example. It is preferable that they are acquired at a timing when ωt+$d_e$ is 90° or 270°, for example. The above allows tan θ (and thus displacement θ) to be acquired with good accuracy.

In this preferred embodiment, the displacement θ is acquired by arctangent computation for the value acquired by dividing the second AC signal y2 by the first AC signal y1. Therefore, with respect to the first AC signal y1 and the second AC signal y2 for one period, the displacement θ can be acquired at any timing if the timing when the value of the signal is near zero is avoided. The frequency at which the displacement θ is acquired may be once per period of the excitation signal, or it may be two or more times. In the case where the displacement θ is acquired multiple times per period of the excitation signal, even when the scale 1 moves at high speed with respect to the magnetic detection head 2, the displacement can be followed and detected at high speed.

As explained above, the displacement detection device 100 of this preferred embodiment detects the displacement of the measurement target in the displacement detection direction. The displacement detection device 100 includes the scale 1, the magnetic detection head 2, and the detection signal processor 3. The scale 1 includes an alternating array of magnetic-responsive portions 12 and non-magnetic-responsive portions 11 at the predetermined detection pitch in the displacement detection direction. The magnetic detection head 2 includes the primary coil 21 to which the excitation signal is applied and at least four secondary coils 22 whose output signals correspond to sine, cosine, minus sine and minus cosine functions, respectively. The output signals of the secondary coils 22 are input to the detection signal processor 3. The detection signal processor 3 computes and outputs the relative displacement information of the scale 1 with respect to the magnetic detection head 2. The detection signal processor 3 includes the first differential amplifier 31, the second differential amplifier 32, and the processor 35. The first differential amplifier 31 outputs the first AC signal y1 acquired by synthesizing the cosine function and the minus cosine function. The second differential amplifier 32 outputs the second AC signal y2 acquired by synthesizing the sine function and the minus sine function. At least at the start of use of this displacement detection device 100, the processor 35 determines the value (the phase displacement estimation amount $d_e$) substantially indicating the phase displacement amount d between the excitation signal and the first and the second AC signals y1, y2. When detecting the displacement of the scale 1 with respect to the magnetic detection head 2, the processor 35 acquires the values of the first AC signal y1 and the second AC signal y2 at the timing based on the determined phase displacement estimation amount $d_e$. The processor 35 performs the arctangent computation using the acquired value of the first AC signal y1 and the acquired value of the second AC signal y2, to output the relative displacement information.

This allows the values of each of the signals to be acquired at a time when the first AC signal y1 and the second AC signal y2 deviate sufficiently from zero. Therefore, by dividing the value of the signal, a highly accurate value of tan θ can be acquired. By performing the arctangent computation on this tan θ value, accurate displacement θ can be acquired. Since displacement is acquired by the arctangent computation, it is possible to acquire displacement multiple times per the excitation signal period while avoiding the timing when the value of each of the signals is close to zero. Thus, in addition to high resolution, fast response of detection can be easily achieved.

In the displacement detection device 100 of this preferred embodiment, the plurality of the identification excitation signals based on the excitation signal are applied to the primary coil 21. The plurality of the identification excitation signals are generated by shifting phases in which each of the phase shift amounts D is different from the other from the original excitation signal. As the respective identification excitation signals are applied to the primary coil 21, the processor 35 acquires the value of the first AC signal y1 and the value of the second AC signal y2 at the constant timing with respect to the original excitation signal, to acquire the aggregation of degrees of deviation of the two signal values from zero (signal deviation aggregation value). The processor 35 acquires the phase shift amount D of the identification excitation signal for which the aggregation is the largest among the plurality of identification excitation signals. The processor 35 acquires the phase displacement estimation amount $d_e$ based on this phase shift amount D.

This allows the timing at which the values of the first AC signal y1 and the second AC signal y2 deviate sufficiently from zero to be acquired, by exciting the primary coil 21 with the identification excitation signals having variously different phases, and by examining.

Next, the second preferred embodiment will be described. In a description of this preferred embodiment, structural elements and features identical or similar to those of the above-described preferred embodiment are given the same corresponding reference numerals on the drawings, and descriptions thereof may be omitted.

In this preferred embodiment, instead of the sequential phase shift method of the excitation signal, the processor 35 uses a waveform tracing method of the output signals from the secondary coil 22 (i.e., the first AC signal y1 and the second AC signal y2) to perform a determination process for the above phase displacement amount, and determines the phase displacement amount used for the identification process.

In the initial process, the processor 35 acquires the values of the first AC signal y1 and the second AC signal y2 with a sampling period that is sufficiently shorter than the signal period, so as to trace the waveforms of the first AC signal y1 and the second AC signal y2. At this time, the normal excitation signal A·sin ωt is applied to the primary coil 21, not the identification excitation signals described above. It is preferable that the AD converters perform the AD conversion at high speed in order to shorten the sampling period.

Figure 6:
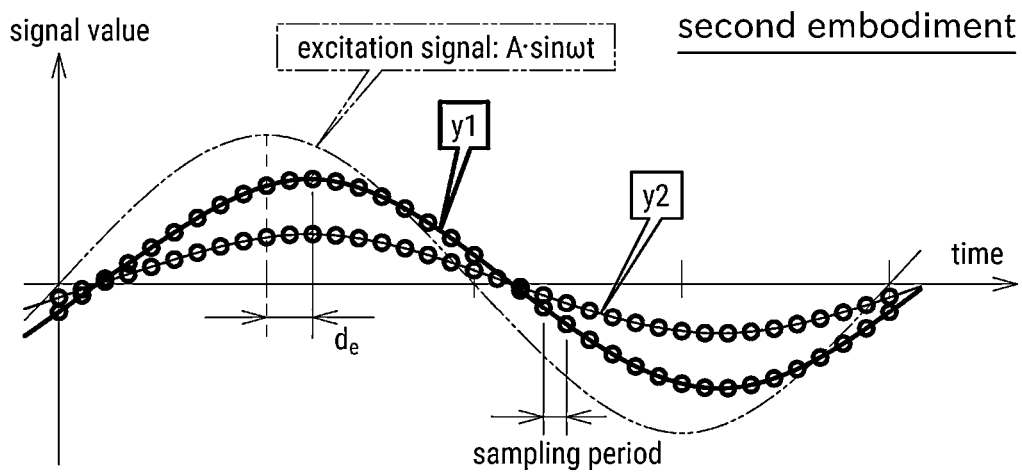
FIG. 6 is a diagram illustrating acquisition of values of the first and the second AC signals in a second preferred of the present invention embodiment.

At each sampling timing, the processor 35 computes the signal deviation aggregation value described above for the pair of the first AC signal y1 and the second AC signal y2. The signal deviation aggregation value can be the square root of the sum of squares of the two signal values or the sum of absolute values, similarly as described above. After calculating the signal deviation aggregation values for the sampling timings respectively, the processor 35 compares the signal deviation aggregation values to each other. This allows the sampling timing with the largest signal deviation aggregation value to be determined. As shown in FIG. 6, the phase displacement estimation amount $d_e$ can be easily acquired based on the sampling timing at which the signal deviation aggregation value is the largest. The subsequent process of acquiring the displacement θ of the measurement target is substantially the same as in the first preferred embodiment, so the description is omitted.

As explained above, in the displacement detection device 100 of this preferred embodiment, the processor 35 acquires the values of the first AC signal y1 and the second AC signal y2 repeatedly with the sampling period shorter than the signal period. For each of the multiple sampling timings, the processor 35 acquires the aggregation of the deviation degrees of the signal values from zero. The processor 35 acquires the sampling timing for which the aggregation is the largest among the plurality of sampling timings at which the aggregation are acquired. The processor 35 acquires the phase displacement estimation amount $d_e$ based on the sampling timing at which the aggregation is the largest.

This allows the timing at which the values of the first AC signal y1 and the second AC signal y2 deviate sufficiently from zero to be acquired by examining the waveform for a short period of time, for example, for one period of the excitation signal.

Next, the third preferred embodiment will be described. In a description of this preferred embodiment, structural elements and features identical or similar to those of the above-described preferred embodiment are given the same corresponding reference numerals on the drawings, and descriptions thereof may be omitted.

This preferred embodiment is suitable in a case where the number of sampling times per period for sampling waveforms cannot be as large as in the second preferred embodiment due to the processing capacity of the AD converter and other reasons. The waveforms to be sampled mean the output signals from the secondary coils 22, i.e., the first AC signal y1 and the second AC signal y2.

Figure 7:
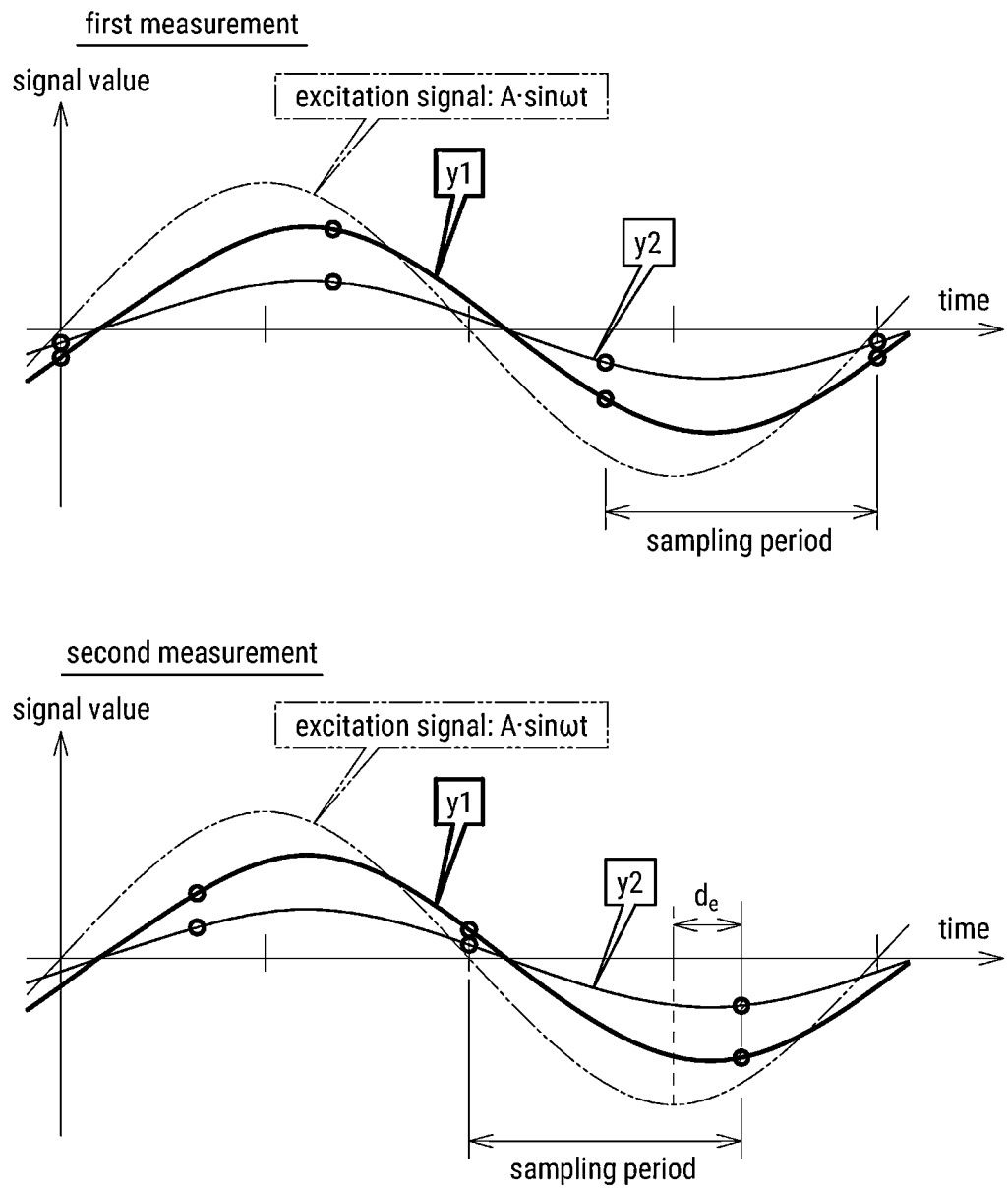
FIG. 7 is a diagram illustrating acquisition of values of the first and the second AC signals in a third preferred embodiment of the present invention.

The following is a specific example of a case where the number of times the excitation signal can be sampled per period is three. In the initial process, the processor 35 uses the sampling waveforms for two periods instead of one period to acquire the AC signal values. In the first period (first) measurement, the values of the first AC signal y1 and the second AC signal y2 are acquired at timings when the phase is 0°, 120°, and 240° with respect to the excitation signal waveform, as shown in the upper portion of FIG. 7. In the second period (second) measurement, the values of the first AC signal y1 and the second AC signal y2 are acquired at timings when the phase is 60°, 180°, and 300° with respect to the excitation signal waveform, as shown in the lower portion of FIG. 7.

Thereafter, the signal deviation aggregation value for each sampling timing is acquired in the same manner as in the second preferred embodiment. The processor 35 acquires the sampling timing at which the signal deviation aggregation value is the largest among the sampling timings for two periods (six times in total), for example.

By making the phase of the sampling timing different for each period, it is the same as sampling the first AC signal y1 and the second AC signal y2 with a shorter period than the actual signal period to determine the phase displacement estimation amount $d_e$. In the example in FIG. 7, an effect equivalent to sampling six times per period to determine the phase displacement estimation amount $d_e$ is realized.

Although two periods of waveforms are sampled in this preferred embodiment, three or more periods of waveforms may be sampled while the sampling phase is shifted by a small amount per period.

Next, the fourth preferred embodiment is described. In a description of this preferred embodiment, structural elements and features identical or similar to those of the above-described preferred embodiment are given the same corresponding reference numerals on the drawings, and descriptions thereof may be omitted.

The detection signal processor 3 of this preferred embodiment can adjust the amplitude "a" of the waveform (a·cos θ·sin ωt) input from the first differential amplifier 31 to the AD converter, and the amplitude "a" of the waveform (a·sin θ·sin ωt) input from the second differential amplifier 32 to the AD converter. This preferred embodiment can be combined with any of the first through third preferred embodiments described above.

As described above, in the configuration from the first through the third preferred embodiments, the value of each of the signals is acquired at the timing when the first AC signal y1 and the second AC signal y2 deviate sufficiently from zero, and the arctangent computation is performed. However, it is conceivable that the amplitude of the waveforms output by the first differential amplifier 31 and the second differential amplifier 32 may not be appropriate for the input voltage range of the AD converters.

Specific examples of waveform amplitudes that are too large or too small will be described below. The physical size allowed for the magnetic detection head 2 varies depending on the measurement target, the size of the surrounding space, and other factors. Considering such circumstances etc., in order to increase the versatility of the displacement detection device 100, the device may be configured to allow one head to be selected from multiple types of magnetic detection heads 2 of different sizes, depending on the situation. The transformer ratio of the primary coil 21 and the secondary coil 22 varies depending on the type of head. If the transformer ratio of the magnetic detection head 2 is different from the transformer ratio assumed by the detection signal processor 3, the amplitude of the waveforms output from the first differential amplifier 31 and the second differential amplifier 32 is too large or too small.

The AD converters are provided downstream of the first differential amplifier 31 and the second differential amplifier 32 in the direction of signal transmission. If the amplitude of the output signals of the first and the second differential amplifiers 31 and 32 is too large for the signal input range of the AD converters, the waveform saturates in the AD converter and false detection of displacement θ occurs. On the other hand, if the amplitude of the output signals of the first and the second differential amplifiers 31 and 32 is too small, the signal-to-noise ratio deteriorates, resulting in a decrease in the detection accuracy of the displacement θ.

Therefore, in the configuration of this preferred embodiment, the amplitude A regarding the excitation signal (A·sin ωt) output by the processor 35 is changeable. After estimating the phase displacement described in the above preferred embodiment, the processor 35 checks whether the waveform peaks of the first AC signal y1 and the second AC signal y2 are within a predetermined range. The values of the first AC signal y1 and the second AC signal y2 (including the peaks) can be acquired from each of the two AD converters.

When using the sequential phase shift method of the first preferred embodiment, the values of the first AC signal y1 and the second AC signal y2 acquired at the timing based on the determined phase displacement estimation amount $d_e$ can be considered to be the peak of the respective waveforms. When using the waveform tracing method of the second preferred embodiment, the peaks of the first AC signal y1 and the second AC signal y2 can be easily acquired.

In this preferred embodiment, the signal deviation aggregation value, defined as the square root of the sum of squares, is computed from the value of the first AC signal y1 and the value of the second AC signal y2, which are acquired at the timing of these substantial waveform peaks, as described above. This signal deviation aggregation value effectively indicates the magnitude of the amplitude "a" of the first AC signal y1 and the second AC signal y2. The signal deviation aggregation value may be defined as the sum of absolute values as described above. In this case also, the signal deviation aggregation value is a rough indication of the magnitude of the amplitude "a" of the first AC signal y1 and the second AC signal y2.

If the computed signal deviation aggregation value is greater than a predetermined range, the processor 35 changes the amplitude of the excitation wave output (amplitude A as described above) so that it is, for example, ½ times larger. As a result, the amplitude "a" of the waveform (a·cos θ·sin ωt) output by the first differential amplifier 31 becomes ½ times larger, and the amplitude "a" of the waveform (a·sin θ·sin ωt) output by the second differential amplifier 32 becomes ½ times larger, for example.

If the computed signal deviation aggregation value is less than the predetermined range, the processor 35 changes the amplitude of the excitation wave output (amplitude A as described above) so that it is, for example, 2 times larger. As a result, the amplitude "a" of the waveform (a·cos θ·sin ωt) output by the first differential amplifier 31 becomes 2 times larger, and the amplitude "a" of the waveform (a·sin θ·sin ωt) output by the second differential amplifier 32 becomes 2 times larger, for example.

With the above adjustment, signals of moderate amplitude are input to the AD converters, so that the displacement θ can be detected with high accuracy.

An example of a specific process will be described with reference to the flow chart in FIG. 8 as follows.

Figure 8:
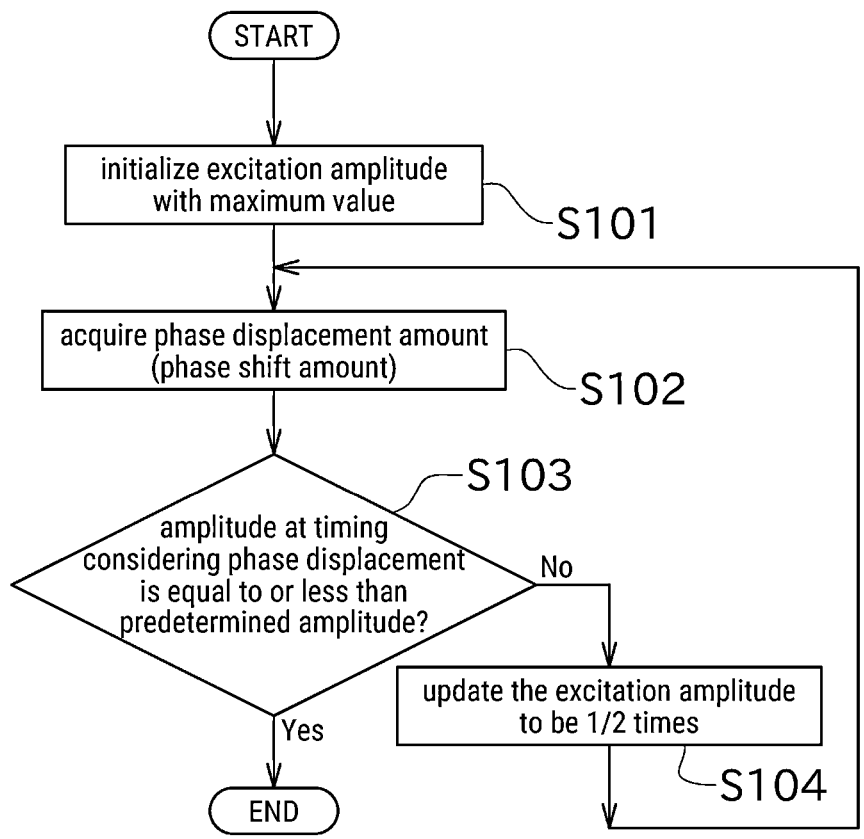
FIG. 8 is a flowchart illustrating a first example of an amplitude adjustment process in a fourth preferred embodiment of the present invention.

When the automatic amplitude adjustment process shown in FIG. 8 is started, the detection signal processor 3 firstly initializes the value of the amplitude A of the excitation signal with the largest value (step S101).

Next, the detection signal processor 3 acquires the phase displacement amount, for example, by the sequential phase shift method (step S102).

The detection signal processor 3 then acquires the values of the first AC signal y1 and the second AC signal y2 at the timing based on the phase displacement estimation amount $d_e$ acquired in step S102. The detection signal processor 3 computes the aforementioned signal deviation aggregation value from the two values and determines whether the signal deviation aggregation value is equal to or less than a predetermined threshold value (step S103).

If, in the determination of step S103, the aforementioned signal deviation aggregation value is equal to or less than the predetermined threshold value, the adjustment process is terminated and the excitation signal amplitude A which is currently set is used in the subsequent process.

If, in the determination in step S103, the signal deviation aggregation value is greater than the predetermined threshold value, the detection signal processor 3 modifies the amplitude A of the excitation signal so that it becomes, for example, ½ of the currently set value (step S104). The process then returns to step S102.

By the above process, the amplitude A of the excitation signal can be adjusted so that the amplitude "a" of the first AC signal y1 and the second AC signal y2 is greater than ½ of the threshold value and equal to or less than the threshold value, for example.

Instead of or in addition to changing the amplitude A of the excitation signal, the amplification gains of the first differential amplifier 31 and the second differential amplifier 32 can also be changed. This method can also change the amplitude "a" of the waveform (a·cos θ·sin ωt) input from the first differential amplifier 31 to the AD converter and the amplitude "a" of the waveform (a·sin θ·sin ωt) input from the second differential amplifier 32 to the AD converter.

The order of the process of determining the value that substantially indicates the phase displacement amount and the process of adjusting the amplitude may be reversed. An example in which the amplitude adjusting process precedes will be described with reference to the flowchart in FIG. 9.

Figure 9:
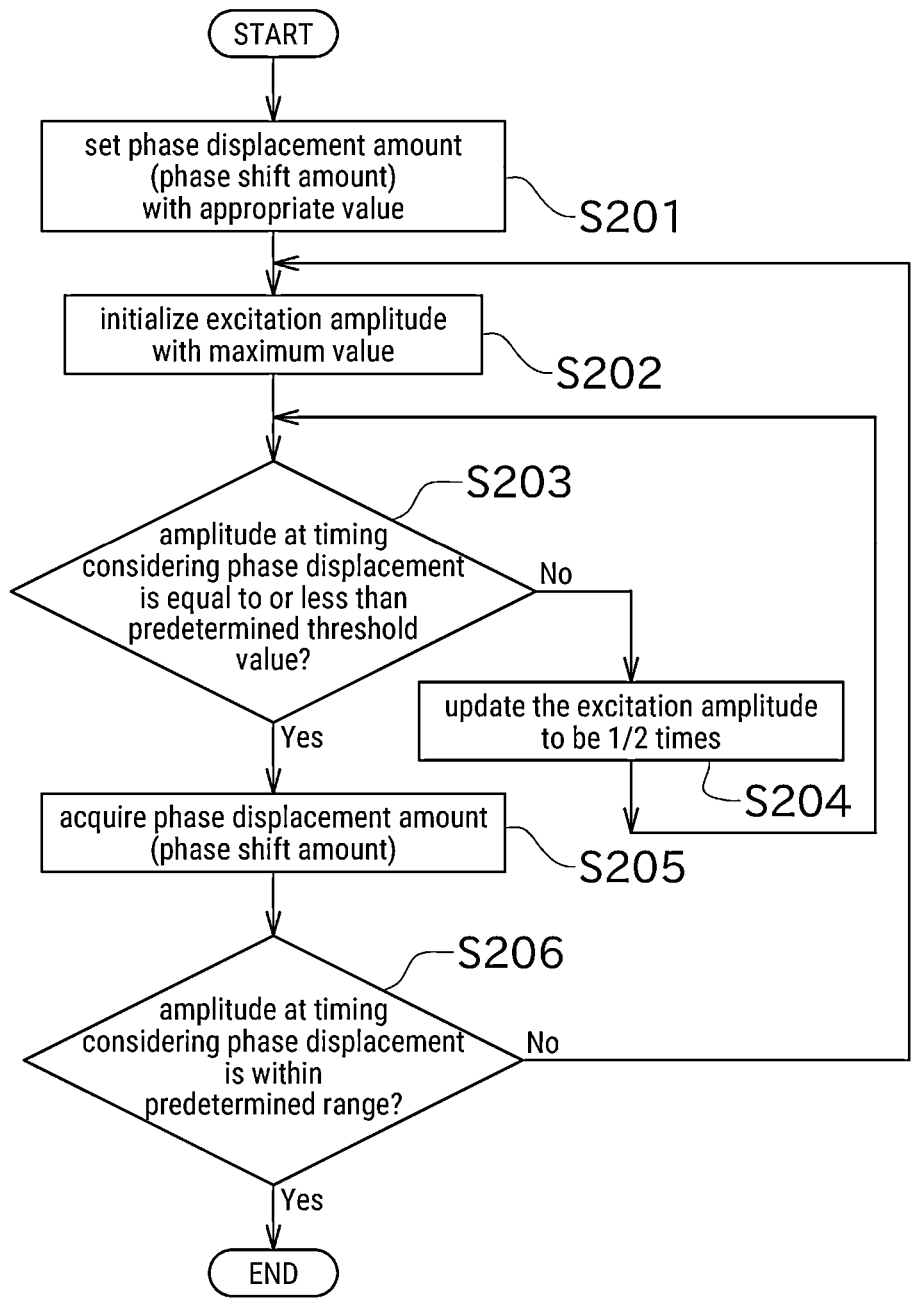
FIG. 9 is a flowchart illustrating a second example of the amplitude adjustment process in the fourth preferred embodiment of the present invention.

When the automatic amplitude adjustment process shown in FIG. 9 is started, the detection signal processor 3 firstly sets an appropriate value as the phase displacement estimation amount $d_e$ indicating phase displacement (step S201). The value set in step S201 is arbitrary and may be, for example, random. This setting of the phase displacement estimation amount $d_e$ is tentative and will be changed later to the value actually estimated.

Next, the detection signal processor 3 initializes the amplitude A of the excitation signal with the largest value (step S202).

The detection signal processor 3 then acquires the values of the first AC signal y1 and the second AC signal y2 at the timing based on the phase displacement estimation amount $d_e$ tentatively set in step S201. The detection signal processor 3 computes the signal deviation aggregation value (in other words, the amplitude "a" of the first AC signal y1 and the second AC signal y2) from the two values and determines whether the signal deviation aggregation value is below a predetermined threshold value (step S203).

If the determination in step S203 shows that the signal deviation aggregation value described above is equal to or less than the predetermined threshold value, the process proceeds to step S205 described later.

If, in the determination of step S203, the above-mentioned signal deviation aggregation value is greater than the predetermined threshold value, the detection signal processor 3 changes the amplitude A of the excitation signal so that it becomes, for example, ½ of the currently set value (step S204). The process then returns to step S203.

By processing steps S202 to S204, the amplitude A of the excitation signal is modified so that the values of the first AC signal y1 and the second AC signal y2 become within a predetermined range based on the values of the first AC signal y1 and the second AC signal y2 acquired at the timing based on the phase displacement estimation amount $d_e$ set in step S201.

Next, the detection signal processor 3 generates the excitation signal with the amplitude A determined by the processing of steps S202 to S204 and acquires the phase displacement estimation amount $d_e$, for example, by the sequential phase shift method (step S205).

The detection signal processor 3 then acquires the values of the first AC signal y1 and the second AC signal y2 at the timing based on the phase displacement estimation amount $d_e$ determined in step S205. The detection signal processor 3 calculates the signal deviation aggregation value from the two signal values and determines whether the signal deviation aggregation value is within a predetermined range (step S206). The predetermined range corresponds to the range that is greater than ½ of the threshold value in step S203 and less than or equal to the threshold value.

If the determination in step S206 shows that the signal deviation aggregation value described above is within the predetermined range, the adjustment process is terminated and the currently set excitation signal amplitude A and the phase displacement estimation amount $d_e$ are used in the subsequent process.

If, in the determination of step S206, the signal deviation aggregation value described above is out of the predetermined range, the phase displacement estimation amount $d_e$ tentatively set in step S201 is considered to have been inappropriate. Therefore, the process returns to step S202 and the adjustment of the amplitude A of the excitation signal is adjusted again. In the process of readjusting the amplitude A, in step S203, the values of the first AC signal y1 and the second AC signal y2 are acquired at the timing based on the phase displacement estimation amount $d_e$ acquired in step S205 (in other words, the most recently acquired phase displacement estimation amount $d_e$). As a result, a more appropriate value of amplitude A is acquired in steps S202 to S204.

Iterating the loop from step S202 to step S206, eventually a combination of the amplitude A of the excitation signal and the phase displacement estimation amount $d_e$ is acquired that satisfies the conditions of step S206. At that timing, the series of processes shown in FIG. 9 ends.

As explained above, the displacement detection device 100 of this preferred embodiment includes the amplitude adjuster that adjusts the amplitude "a" of the first AC signal y1 output by the first differential amplifier 31 and the second AC signal y2 output by the second differential amplifier 32.

This allows, for example, the amplitude "a" of the first AC signal y1 and the second AC signal y2 to be automatically modified in response to changes in the transformer ratio of the magnetic detection head 2. As a result, suitable waveforms for the detection of displacement can be stably acquired.

The adjustment of the amplitude "a" described above can be performed by the "excitation wave output" block of the detection signal processor 3 adjusting the amplitude A of the AC current flowing in the primary coil 21. In this configuration, the structural element realizing the "excitation wave output" corresponds to the amplitude adjuster.

In this case, the gain setting process for the first differential amplifier 31 and the second differential amplifier 32 can be omitted. Thus, a simplified process can be realized.

The adjustment of the amplitude "a" described above can also be performed by adjusting the amplification gains of the first differential amplifier 31 and the second differential amplifier 32. In this configuration, the "gain modification" block provided by the detection signal processor 3, which is not shown in the figure, corresponds to the amplitude adjuster.

In this case, the amplitude "a" of the waveform can be adjusted more directly.

While the above describes suitable preferred embodiments of the present invention, the above configurations can be modified, for example, as follows.

The scale 1 is not limited to the configuration described above, but can be configured as appropriate as long as the different magnetic properties (strength of magnetism, direction of the generated magnetic field, etc.) are repeated with respect to each other. For example, the magnetic-responsive portions 12 may include ferromagnetic and weakly magnetic/non-magnetic elements alternating in the longitudinal direction of the scale 1. The repetition of the change in magnetic properties may be achieved by lining up the N and S poles of the magnets.

If the secondary coil 22 is capable of capturing changes in response to displacement from the scale 1 (the magnetic-responsive portions 12), the primary coil 21 may be located closer to the scale 1 and the secondary coils 22 may be located farther from the scale 1.

The magnetic detection element may include a conductive pattern on a printed circuit board, a Hall element, etc., instead of the secondary coil 22.

The processor 35 may perform the determination of the phase displacement estimation amount $d_e$ at other suitable timing that does not affect the use of the displacement detection device 100, in addition to the start timing of use of the displacement detection device 100.

In the first preferred embodiment, the interval at which the phase shift amount D of the identification excitation signal is different is not limited to 10°, but may be 20°, 45°, etc.

In the first preferred embodiment, if the computed signal deviation aggregation value tends to increase and then decrease as the phase shift amount D of the identification excitation signal is increased, and it is determined that the largest of the signal deviation aggregation value is unlikely to be updated, the process may be terminated. Similarly, in the second preferred embodiment, if the calculated signal deviation aggregation value tends to increase and then decrease according to repeated sampling, the process may be terminated.

The linearity calibration and fast prediction computation shown in FIG. 1 may be omitted as appropriate depending on the conditions for use.

In the fourth preferred embodiment, the amplitude A of the excitation signal is modified by multiplying by ½, for example, but may be multiplied by any other number less than 1. The amplitude may be modified iso-differentially instead of being modified iso-proportionally. The amplitude may be modified multiple times as shown in FIGS. 8 and 9, or only once. The amplification gains of the differential amplifiers 31, 32 may also be modified in various ways, as described above.

In the examples of FIGS. 8 and 9, the maximum value is set as the initial value of the amplitude A of the excitation signal and is modified to decrease as necessary. Alternatively, the minimum value may be set as the initial value of the amplitude A of the excitation signal and modified to increase as necessary. In this case, the amplitude of the excitation signal can be modified, for example, by multiplying it by any number greater than 1 (for example, 2). The amplification gains of the differential amplifiers 31, 32 can also be modified in various ways, as described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A displacement detection device to detect displacement of a measurement target in a displacement detection direction, the displacement detection device comprising:
   a scale including magnetic-responsive portions and non-magnetic-responsive portions alternately arranged at a predetermined detection pitch in the displacement detection direction;
   a sensor head including an excitation element to which an excitation signal is applied, and at least four magnetic detection elements to provide output signals corresponding to sine, cosine, minus sine, and minus cosine functions, respectively;
   a signal processor to which the output signals of the magnetic detection elements are input to compute and output relative displacement information of the scale with respect to the sensor head; and
   an amplitude adjuster; wherein
   the signal processor includes:
      a first differential amplifier to output a first AC signal acquired by synthesizing the cosine function and the minus cosine function;
      a second differential amplifier to output a second AC signal acquired by synthesizing the sine function and the minus sine function; and
      a processor to determine, at least when use of the displacement detection device is started, a value substantially indicating a phase displacement amount between the excitation signal and the first and the second AC signals, and to acquire, when detecting the displacement of the measurement target, values of the first AC signal and the second AC signal at a timing based on the determined value, and to perform an arctangent computation using the acquired value of the first AC signal and the acquired value of the second AC signal to output the relative displacement information;
   the amplitude adjuster is operable to adjust an amplitude of the first AC signal output by the first differential amplifier and an amplitude of the second AC signal output by the second differential amplifier; and
   the amplitude adjuster is operable to adjust an amplitude of an AC current flowing to the excitation element.

2. The displacement detection device according to claim 1, wherein the amplitude adjuster is operable to adjust amplification gains of the first differential amplifier and the second differential amplifier.

3. A displacement detection device to detect displacement of a measurement target in a displacement detection direction, the displacement detection device comprising:
   a scale including magnetic-responsive portions and non-magnetic-responsive portions alternately arranged at a predetermined detection pitch in the displacement detection direction;
   a sensor head including an excitation element to which an excitation signal is applied, and at least four magnetic detection elements to provide output signals corresponding to sine, cosine, minus sine, and minus cosine functions, respectively; and
   a signal processor to which the output signals of the magnetic detection elements are input to compute and output relative displacement information of the scale with respect to the sensor head; wherein
   the signal processor includes:
      a first differential amplifier to output a first AC signal acquired by synthesizing the cosine function and the minus cosine function;

a second differential amplifier to output a second AC signal acquired by synthesizing the sine function and the minus sine function; and a processor to determine, at least when use of the displacement detection device is started, a value substantially indicating a phase displacement amount between the excitation signal and the first and the second AC signals, and to acquire, when detecting the displacement of the measurement target, values of the first AC signal and the second AC signal at a timing based on the determined value, and to perform an arctangent computation using the acquired value of the first AC signal and the acquired value of the second AC signal to output the relative displacement information;

at least when the use of the displacement detection device is started, a plurality of identification excitation signals generated by shifting phases in which each of phase shift amounts is different from others from the excitation signal, are applied to the excitation element;

as each of the plurality of identification excitation signals is applied to the excitation element, the processor is configured or programmed to acquire a value of the first AC signal and a value of the second AC signal at a timing that is constant with respect to an original excitation signal, to acquire an aggregation of deviation degrees of the values of the first AC signal and the second AC signal from zero; and the processor is configured or programmed to acquire the phase shift amount of the identification excitation signal for which the aggregation is largest among the plurality of the identification excitation signals, and to acquire the value substantially indicating the phase displacement amount based on the phase shift amount acquired by the processor.

4. A displacement detection device to detect displacement of a measurement target in a displacement detection direction, the displacement detection device comprising:

a scale including magnetic-responsive portions and non-magnetic-responsive portions alternately arranged at a predetermined detection pitch in the displacement detection direction;

a sensor head including an excitation element to which an excitation signal is applied, and at least four magnetic detection elements to provide output signals corresponding to sine, cosine, minus sine, and minus cosine functions, respectively; and a signal processor to which the output signals of the magnetic detection elements are input to compute and output relative displacement information of the scale with respect to the sensor head; wherein the signal processor includes:

a first differential amplifier to output a first AC signal acquired by synthesizing the cosine function and the minus cosine function;

a second differential amplifier to output a second AC signal acquired by synthesizing the sine function and the minus sine function; and a processor to determine, at least when use of the displacement detection device is started, a value substantially indicating a phase displacement amount between the excitation signal and the first and the second AC signals, and to acquire, when detecting the displacement of the measurement target, values of the first AC signal and the second AC signal at a timing based on the determined value, and to perform an arctangent computation using the acquired value of the first AC signal and the acquired value of the second AC signal to output the relative displacement information;

at least when the use of the displacement detection device is started, the processor is configured or programmed to repeatedly acquire a value of the first AC signal and a value of the second AC signal with a sampling period shorter than a period of the signals, and for each of a plurality of sampling timings, the processor is configured or programmed to acquire an aggregation of deviation degrees of the values of the first AC signal and the second AC signal from zero; and the processor is configured or programmed to acquire the sampling timing at which the aggregation is largest among the plurality of the sampling timings at which the aggregations are acquired, and to acquire the value substantially indicating the phase displacement amount based on the sampling timing acquired by the processor.

* * * * *